(12) United States Patent
Park et al.

(10) Patent No.: US 9,800,072 B2
(45) Date of Patent: Oct. 24, 2017

(54) COMMUNICATION TERMINAL FOR CONSTRUCTING DAISY CHAIN COMMUNICATION NETWORK WITHOUT DISTINCTION BETWEEN INPUT CONNECTOR AND OUTPUT CONNECTOR

(71) Applicant: LG CHEM, LTD., Seoul (KR)

(72) Inventors: Jong-Min Park, Daejeon (KR); Jin-Seok Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 160 days.

(21) Appl. No.: 14/767,680

(22) PCT Filed: Oct. 20, 2014

(86) PCT No.: PCT/KR2014/009844
§ 371 (c)(1),
(2) Date: Aug. 13, 2015

(87) PCT Pub. No.: WO2015/057030
PCT Pub. Date: Apr. 23, 2015

(65) Prior Publication Data
US 2015/0372524 A1    Dec. 24, 2015

(30) Foreign Application Priority Data

Oct. 18, 2013  (KR) ........................ 10-2013-0124705

(51) Int. Cl.
*H02J 7/00*   (2006.01)
*G06F 13/00*  (2006.01)
(Continued)

(52) U.S. Cl.
CPC .............. *H02J 7/0068* (2013.01); *G06F 1/26* (2013.01); *G06F 1/32* (2013.01); *G06F 13/00* (2013.01);
(Continued)

(58) Field of Classification Search
CPC .... H05B 37/0272; H02J 7/0068; H02J 9/065; H02J 50/20; H02J 50/80; H02J 5/005;
(Continued)

(56) References Cited

U.S. PATENT DOCUMENTS

2010/0295383 A1    11/2010  Cummings
2011/0121654 A1*    5/2011  Recker .................... H02J 9/065
                                                    307/66
(Continued)

FOREIGN PATENT DOCUMENTS

JP    2012-253836 A    12/2012
JP    2013-26895 A      2/2013
(Continued)

OTHER PUBLICATIONS

International Search Report, issued in PCT/KR2014/009844, dated Jan. 23, 2015.

*Primary Examiner* — Binh Tat
(74) *Attorney, Agent, or Firm* — Birch, Stewart, Kolasch & Birch, LLP

(57) ABSTRACT

Disclosed is a communication terminal for constructing a daisy chain communication network without distinction between an input connector and an output connector.

9 Claims, 3 Drawing Sheets

(51) Int. Cl.
*G06F 1/26* (2006.01)
*G06F 1/32* (2006.01)
*G06F 13/42* (2006.01)

(52) U.S. Cl.
CPC ........ *G06F 13/4247* (2013.01); *H02J 7/0018* (2013.01)

(58) Field of Classification Search
CPC .... H02J 7/34; H02J 7/345; H02J 9/061; H02J 3/00; H02J 1/00; H02J 1/102; H02J 2001/106; H02J 7/0008; H02J 7/0018
USPC .................................................. 320/107–115
See application file for complete search history.

(56) References Cited

U.S. PATENT DOCUMENTS

| | | | |
|---|---|---|---|
| 2012/0080944 A1* | 4/2012 | Recker | H02J 9/02 307/25 |
| 2012/0218790 A1 | 8/2012 | Sato et al. | |
| 2013/0002016 A1 | 1/2013 | Furukawa et al. | |
| 2013/0249319 A1* | 9/2013 | Cummings | H01L 31/02021 307/131 |
| 2013/0253715 A1 | 9/2013 | Cho et al. | |
| 2015/0177329 A1 | 6/2015 | Kiuchi | |

FOREIGN PATENT DOCUMENTS

| | | |
|---|---|---|
| KR | 96-6634 U | 2/1996 |
| KR | 20-0389718 Y1 | 7/2006 |
| KR | 10-0773087 B1 | 11/2007 |
| KR | 20-2008-0003979 U | 9/2008 |
| KR | 10-2012-0094529 A | 8/2012 |
| KR | 10-2013-0058373 A | 6/2013 |
| KR | 10-2013-0081683 A | 7/2013 |
| KR | 10-2013-0085203 A | 7/2013 |

\* cited by examiner

COMMUNICATION TERMINAL FOR CONSTRUCTING DAISY CHAIN COMMUNICATION NETWORK WITHOUT DISTINCTION BETWEEN INPUT CONNECTOR AND OUTPUT CONNECTOR

TECHNICAL FIELD

The present disclosure relates to a communication terminal, and more particularly, to a communication terminal for constructing a daisy chain communication network without distinction between an input connector and an output connector.

The present application claims priority to Korean Patent Application No. 10-2013-0124705 filed in the Republic of Korea on Oct. 18, 2013, the disclosures of which are incorporated herein by reference.

BACKGROUND ART

Due to its characteristics of being easily applicable to various products and electrical properties such as a high energy density, a secondary battery is not only commonly applied to a portable device, but universally applied to an electric vehicle (EV), a hybrid vehicle (HV), or an energy storage system that is propelled by an electric motor. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure consisting of a plurality of cell assemblies connected in series, each cell assembly including a plurality of unit cells, to obtain high power. Also, the unit cell includes a cathode current collector and an anode current collector, a separator, an active material, and an electrolyte solution, and allows repeated charging and discharging by electrochemical reactions between the components.

In addition to this basic structure, the battery pack further includes a battery management system (BMS) to monitor and control a state of a secondary battery by applying an algorithm for control of power supply to a driving load such as a motor, measurement of electrical characteristic values such as current or voltage, charge/discharge control, voltage equalization control, state of charge (SOC) estimation, and the like.

Recently, with the increasing need for a high-capacity structure as well as utilization as an energy storage source, the demand for a battery pack of a multi-module structure in which a plurality of battery modules including a plurality of batteries connected in series and/or in parallel are assembled, is also increasing.

Because the battery pack of the multi-module structure includes a plurality of battery cells, there is a limitation in controlling the charge/discharge state of all the battery cells using a single BMS. Accordingly, a recent technology has been introduced in which a BMS is provided to each battery module included in the battery pack, any one of the BMSs is designated as a master BMS, and the remaining BMSs are designated as slave BMS, such that the charge and discharge of each battery module is controlled in a master-slave mode.

The slave BMS is in a sleep state in normal condition and wakes up from the sleep state by a control signal from the master BMS. The control signal may be transmitted via various communication networks, and generally a serial communication network is mainly used. The serial communication network has advantages of being easy to implement a communication structure, good signal transmission characteristics, and making use of an existing communication line, resulting in remarkable cost reduction.

The serial communication network has a connection architecture in which a receiver receiving a signal becomes a transmitter and delivers the signal to another adjacent receiver connected thereto by a relay scheme. Thus, between each BMS, an output connector for outputting a signal and an input connector for inputting a signal are separately provided and connected to each other.

FIG. 1 is a diagram illustrating an example of a configuration of a communication network according to a related art.

Referring to FIG. 1, it can be seen that computer systems 10, 20, and 30 corresponding to communication terminals constitutes a communication network. As shown in FIG. 1, it can be seen that, to construct a serial communication network, input parts 16, 26, and 36 and output parts 18, 28, and 38 included in each computer system 10, 20, and 30 are provided separately from each other and connected to each other.

However, when constructing the serial communication network in this way, if the shape of the input part connector is not clearly distinguished from the shape of the output part connector, an operator may get confused. Also, manufacturing an input part connector and an output part connector separately in different shapes will be one factor of increasing a production cost. Therefore, there is a need for a communication terminal with compatible input and output connectors when constructing a serial communication network.

DISCLOSURE

Technical Problem

The present disclosure is designed to solve the problem of the related art, and therefore the present disclosure is directed to providing a communication terminal for constructing a daisy chain communication network without distinction between an input connector and an output connector.

Technical Solution

To achieve the object, a communication terminal according to the present disclosure is a communication terminal which is connected via a serial communication network, the communication terminal, and includes a control unit having an input port and an output port, a first connector electrically connected to the input port and the output port, a second connector electrically connected to the input port and the output port, a first-first diode electrically connected between the first connector and the input port to allow an electric current to flow in a direction from the first connector toward the input port, a first-second diode electrically connected between the first connector and the output port to allow an electric current to flow in a direction from the output port toward the first connector, a second-first diode electrically connected between the second connector and the output port to allow an electric current to flow in a direction from the output port toward the second connector, and a second-second diode electrically connected between the second connector and the input port to allow an electric current to flow in a direction from the second connector toward the input port.

According to an exemplary embodiment of the present disclosure, the input port may receive a signal for waking up the control unit in a sleep state.

According to an exemplary embodiment of the present disclosure, the output port may output a signal for waking up other control unit in a sleep state.

According to an exemplary embodiment of the present disclosure, the serial communication network may be a daisy chain.

According to an exemplary embodiment of the present disclosure, the control unit may measure an electrical characteristic value of a secondary battery. The electrical characteristic value of the secondary battery may be a value of at least one of voltage and current of the secondary battery.

The communication terminal according to the present disclosure may be one component of a battery pack including a battery management system including a communication terminal and a plurality of battery modules comprising a plurality of secondary batteries electrically connected. In this instance, each battery management system may be electrically connected to each battery module.

The battery pack according to the present disclosure may be one component of a battery operating system including a battery pack and a load which is supplied with power from the battery pack. The load may be an electrical drive means or a portable device.

Advantageous Effects

According to one aspect of the present disclosure, in connectors being connected to the outside to construct a communication network, there is no distinction between input and output, dissimilar to a related art. That is, a communication network may be constructed by connecting any two connectors to an electrical line irrespective of locations and an order of the connectors.

According to another aspect of the present disclosure, an operation of constructing a communication network is made easy because an operator does not need to distinguish an input connector and an output connector. Thus, time and operator efforts may be saved.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
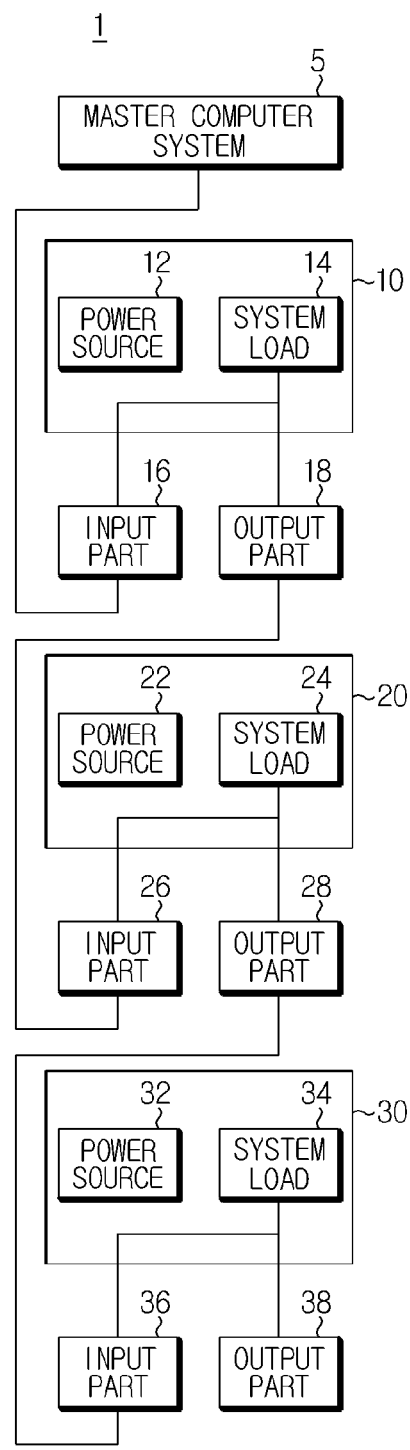
FIG. 1 is a diagram illustrating an example of a configuration of a communication network according to a related art.
Figure 2:
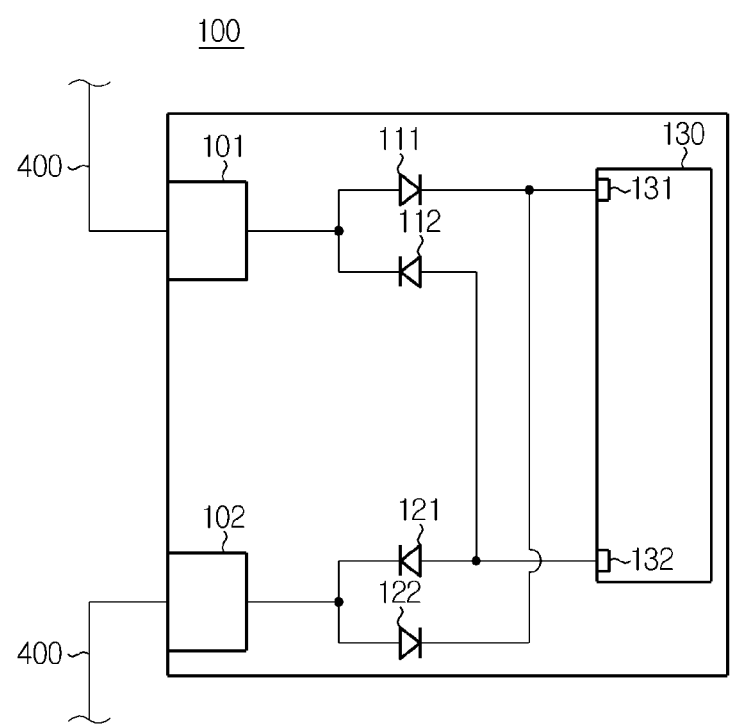
FIG. 2 is a circuit diagram schematically illustrating a configuration of a communication terminal according to an exemplary embodiment of the present disclosure.

FIG. 2 is a circuit diagram schematically illustrating a configuration of a communication terminal 100 according to an exemplary embodiment of the present disclosure.

Referring to FIG. 2, the communication terminal 100 according to the present disclosure includes a first connector 101, a second connector 102, a first-first diode 111, a first-second diode 112, a second-first diode 121, a second-second diode 122, and a control unit 130.

The communication terminal 100 according to the present disclosure is connected to other communication terminal or an external device via a serial communication network 400. Thus, the first connector 101 and the second connector 102 are a connection terminal for constructing the serial communication network 400.

The control unit 130 includes an input port 131 and an output port 132.

According to an exemplary embodiment of the present disclosure, the control unit 130 may be a microprocessor that maintains a sleep state in a normal condition and wakes up from the sleep state when receiving a wake-up signal from the outside. Thus, the input port 131 receives a signal for waking up the control unit 130 in a sleep state. Also, the output port 132 outputs a signal for waking up other control unit in a sleep state.

The signal for waking up the control unit 130 is received from the outside through the first connector 101 or the second connector 102. Also, the signal for waking up other control unit 130 is transmitted through the first connector 101 or the second connector 102. Thus, the first connector 101 is electrically connected to the input port 131 and the output port 132. Also, the second connector 102 is electrically connected to the input port 131 and the output port 132.

In the connector being connected to the outside to construct a communication network, the communication terminal 100 according to the present disclosure does not need to distinguish input and output as compared to the related art. That is, there is an advantage that a communication network may be constructed by connecting the two connectors 101 and 102 to an electrical line irrespective of locations and an order.

However, the input port 131 and the output port 132 the control unit 130 need to be distinguished based on the type of a signal. Thus, to electrically connect the input port 131 and the output port 132 with the need to distinguish input and output as opposed to the first connector 101 and the second connector 102 without distinction between input and output, the first-first diode 111, the first-second diode 112, the second-first diode 121, and the second-second diode 122 are disposed between the first connector 101/the second connector 102 and the input port 131/the output port 132.

The first-first diode 111 is electrically connected between the first connector 101 and the input port 131 to allow an electric current to flow in a direction from the first connector 101 toward the input port 131.

The first-second diode 112 is electrically connected between the first connector 101 and the output port 132 to allow an electric current to flow in a direction from the output port 132 toward the first connector 101.

The second-first diode 121 is electrically connected between the second connector 102 and the output port 132 to allow an electric current to flow in a direction from the output port 132 toward the second connector 102.

The second-second diode 122 is electrically connected between the second connector 102 and the input port 131 to allow an electric current to flow in a direction from the second connector 102 toward the input port 131.

Hereinafter, a description of reception and output of input/output signals is provided through an example in which a plurality of the communication terminals 100 according to the present disclosure is connected via the serial communication network 400.

Figure 3:
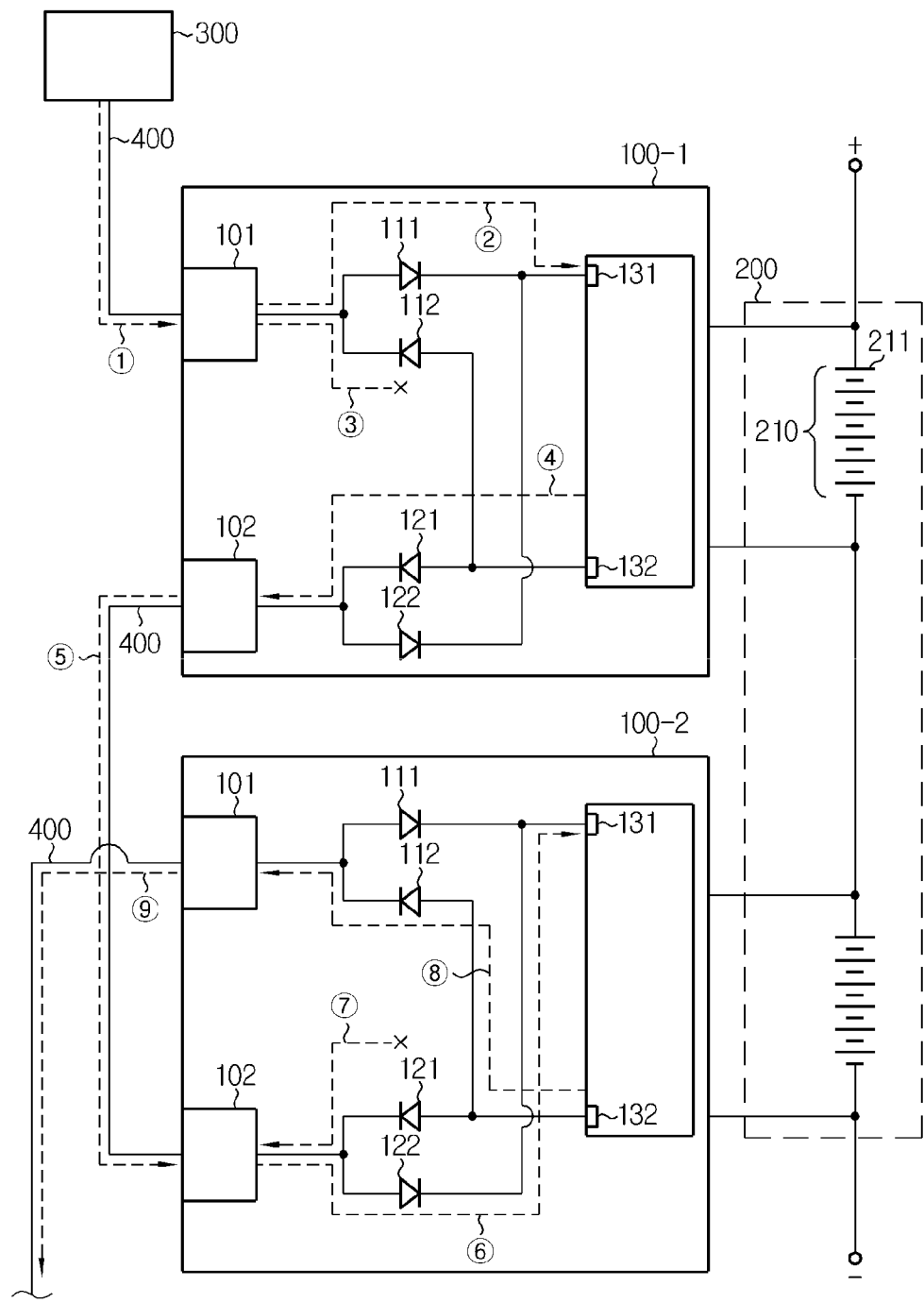
FIG. 3 is a block diagram schematically illustrating a configuration of a battery pack including a plurality of communication terminals according to an exemplary embodiment of the present disclosure.

FIG. 3 is a block diagram schematically illustrating a configuration of a battery pack 200 including a plurality of communication terminals 100 according to an exemplary embodiment of the present disclosure.

Referring to FIG. 3, it can be seen that two communication terminals 100 according to the present disclosure are electrically connected to the battery pack 200. For convenience, an upper communication terminal refers to a first communication terminal 100-1, and a lower communication terminal refers to a second communication terminal 100-2.

The communication terminal 100 according to the present disclosure may be included in a battery management system (BMS) configured to manage the battery pack 200. The BMS may further include an additional component other than the communication terminal 100 according to the present disclosure if necessary, but for simplification of the drawings, the BMS is illustrated as including only the communication terminal 100 according to the present disclosure. Thus, it should be understood that the communication terminals 100-1 and 100-2 of FIG. 3 are a BMS.

To play a role as a BMS, the control unit 130 may measure electrical characteristic values of secondary battery cells 211. In this instance, the electrical characteristic value of the secondary battery cell 211 represents a value of at least one of voltage and current of the secondary battery cell 211. Further, the control unit 130 may include algorithms for performing various control functions applicable at the ordinary level, including measurement of electrical characteristic values such as voltage or current of each secondary battery cell 211 as well as charge/discharge control, voltage equalization control and state of charge (SOC) estimation of the secondary battery cell 211. Also, the control unit 130 may include an algorithm for transmitting and receiving data according to known communication protocols.

To execute various control logics described in the foregoing, the control unit 130 may include a processor, an application-specific integrated circuit (ASIC), other chipsets, a logic circuit, a register, a communication modem, a data processing device, and the like, known in the art pertaining to the present disclosure. Also, when the exemplary control logics are implemented as software, the control unit 130 may be implemented as an assembly of program modules In this instance, the battery pack 200 consists of a plurality of secondary battery cells 211 electrically connected to each other. The battery pack 200 includes at least one secondary battery cell 211, and there is no limitation on a type of the secondary battery cell 211. Each secondary battery cell 211 may be embodied as a lithium ion battery, a lithium polymer battery, a nickel-cadmium battery, a nickel-hydrogen battery, a nickel-zinc battery, and the like, that is rechargeable and needs to consider a charge or discharge voltage. Also, the number of the secondary battery cells 211 included in the battery pack 200 may be variously set based on the output voltage or the charge/discharge capacity required. However, the present disclosure is not limited by a type, an output voltage and a charge capacity of the secondary battery cell 211, and the like. Although FIG. 3 shows that the secondary battery cells 211 are all connected in series, the present disclosure is not limited to a connection method of the secondary battery cells 211.

A predetermined number of the secondary battery cells 211 are assembled to construct a battery module 210. Also, for each battery module 210, each BMS is connected thereto. The BMS of FIG. 3 employs technology for charge/discharge control of each battery module 210 by a master-slave method. Thus, the BMS, that is, the communication terminal 100 according to the present disclosure maintains a sleep state in a normal condition, and wakes up from the sleep state by a control signal from a master or external device 200.

The communication terminal 100 according to the present disclosure constitutes the serial communication network 400, and transmits and receives a signal for controlling the wake-up.

According to an exemplary embodiment of the present disclosure, the serial communication network 400 is a daisy chain. The daisy chain refers to a bus wiring scheme in which multiple devices are connected in sequence. Dissimilar to simple bus connection, the daisy chain supports a signal transmission method by which one device in the chain may transmit a signal to other device by a relay scheme. The daisy chain is known technology, and its detailed description is omitted herein.

A signal for waking up the control unit 130 from the external device 300 is received by the first connector 101 of the first communication terminal 100-1 (①). The signal received by the first connector 101 is inputted in the input port 131 of the control unit 130 through the first-first diode 111 (②). In contrast, the signal received by the first connector 101 is interrupted by the first-second diode 112 and is not transmitted to the output port 132 of the control unit 130 (③).

When the control unit 130 included in the first communication terminal 100-1 wakes up, a signal for waking up the control unit 130 included in the second communication terminal 100-2 is outputted (④). The signal is outputted to the second connector 102 of the first communication terminal 100-1 through the second-first diode 121 (⑤).

Referring to FIG. 3, an embodiment is shown in which the signal outputted from the second connector 102 of the first communication terminal 100-1 is inputted in the second connector 102 of the second communication terminal 100-2, dissimilar to the first communication terminal 100-1.

The signal received by the second connector 102 of the second communication terminal 100-2 is inputted in the input port 131 of the control unit 130 through the second-second diode 122 (⑥). In contrast, the signal received by the second connector 102 of the second communication terminal 100-2 is interrupted by the second-first diode 121 and is not transmitted to the output port 132 of the control unit 130 (⑦).

When the control unit 130 included in the second communication terminal 100-2 wakes up, the control unit 130 outputs a signal for waking up a control unit (not shown) included in a third communication terminal (not shown) (⑧). The signal is outputted to the first connector 101 of the second communication terminal 100-2 through the first-second diode 112 (⑨).

In this instance, the battery pack 200 according to the present disclosure may be one component of a battery operating system including the battery pack 200 and a load which is supplied with power from the battery pack 200.

The battery operating system may include, for example, an electric vehicle (EV), a hybrid electric vehicle (HEV), an electric bike (E-Bike), a power tool, an energy storage system, an uninterruptible power supply (UPS), a portable computer, a mobile phone, a portable audio device, a portable video device, and the like, and the load may include, for example, a motor that generates a rotational force by power supplied from the battery pack, or a power inverter circuit that inverts power supplied from the battery pack to power required for various circuit components.

In the description of the present disclosure, it should be understood that each element of the present disclosure shown in FIGS. 2 and 3 is distinguished logically rather than physically.

That is, each element corresponds to a logic element to realize the technical spirit of the present disclosure, and accordingly, even though each element is integrated or separated, it should be construed as falling within the scope of the present disclosure if a function performed by a logic element of the present disclosure can be implemented, and it should be understood that it falls within the scope of the present disclosure regardless of whether names are identical or not if it is an element performing an identical or similar function.

While the present disclosure has been hereinabove described in connection with only a limited number of embodiments and drawings, the present disclosure is not limited thereto and it should be understood that various changes and modifications may be made by an ordinary person skilled in the art within the spirit and scope of the disclosure and the appended claims and their equivalents.

What is claimed is:

1. A communication terminal which is connected via a serial communication network, the communication terminal comprising:
    a control unit having an input port and an output port;
    a first connector electrically connected to the input port and the output port;
    a second connector electrically connected to the input port and the output port;
    a first-first diode electrically connected between the first connector and the input port to allow an electric current to flow in a direction from the first connector toward the input port;
    a first-second diode electrically connected between the first connector and the output port to allow an electric current to flow in a direction from the output port toward the first connector;
    a second-first diode electrically connected between the second connector and the output port to allow an electric current to flow in a direction from the output port toward the second connector; and
    a second-second diode electrically connected between the second connector and the input port to allow an electric current to flow in a direction from the second connector toward the input port,
    wherein the control unit measures an electrical characteristic value of a secondary battery.

2. The communication terminal according to claim 1, wherein the input port receives a signal for waking up the control unit in a sleep state.

3. The communication terminal according to claim 1, wherein the output port outputs a signal for waking up other control unit in a sleep state.

4. The communication terminal according to claim 1, wherein the serial communication network is a daisy chain.

5. The communication terminal according to claim 1, wherein the electrical characteristic value of the secondary battery is a value of at least one of voltage and current of the secondary battery.

6. A battery pack comprising:
    a battery management system comprising a communication terminal according to claim 1; and
    a plurality of battery modules comprising a plurality of secondary batteries electrically connected.

7. The battery pack according to claim 6, wherein each battery management system is electrically connected to each battery module.

8. A battery operating system comprising:
    a battery pack according to claim 7; and
    a load which is supplied with power from the battery pack.

9. The battery operating system according to claim 8, wherein the load is an electrical drive means or a portable device.

* * * * *